(12) United States Patent
Wang et al.

(10) Patent No.: US 10,485,166 B2
(45) Date of Patent: Nov. 26, 2019

(54) POWER TOOL

(71) Applicant: Nanjing Chervon Industry Co., Ltd., Nanjing (CN)

(72) Inventors: Zhen Wang, Nanjing (CN); Fangjie Nie, Nanjing (CN); Qian Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 161 days.

(21) Appl. No.: 15/537,981

(22) PCT Filed: Dec. 29, 2015

(86) PCT No.: PCT/CN2015/099451
§ 371 (c)(1),
(2) Date: Dec. 27, 2017

(87) PCT Pub. No.: WO2016/107551
PCT Pub. Date: Jul. 7, 2016

(65) Prior Publication Data
US 2018/0160620 A1     Jun. 14, 2018

(30) Foreign Application Priority Data

Dec. 30, 2014  (CN) .......................... 2014 1 0842915

(51) Int. Cl.
*A01D 34/68* (2006.01)
*A01D 34/64* (2006.01)
(Continued)

(52) U.S. Cl.
CPC ............. *A01D 34/68* (2013.01); *A01D 34/64* (2013.01); *A01D 34/78* (2013.01); *A01D 34/81* (2013.01); *A01D 2101/00* (2013.01)

(58) Field of Classification Search
CPC ........ A01D 34/00; A01D 34/64; A01D 34/68; A01D 34/78; A01D 34/81; A01D 69/02; A01D 2101/00
See application file for complete search history.

(56) References Cited

U.S. PATENT DOCUMENTS

| 4,446,680 A | 5/1984 | Alessandro | |
| 5,402,626 A * | 4/1995 | Zinck | A01D 34/78 56/11.9 |

(Continued)

FOREIGN PATENT DOCUMENTS

| CN | 1171030 A | 1/1998 |
| CN | 102687625 | 9/2012 |

(Continued)

OTHER PUBLICATIONS

ISA/CN, Int. Search Report issued on PCT application No. CN2015/099451, dated Apr. 5, 2016, 2 pages.

*Primary Examiner* — Robert E Pezzuto
*Assistant Examiner* — Joan D Misa
(74) *Attorney, Agent, or Firm* — Greenberg Traurig, LLP

(57) ABSTRACT

The invention discloses a power tool and a lawn mower. They mainly include a functional device and a power device. The functional device is formed with a mounting portion for mounting the power device. The power device includes a prime mover and battery packs detachably coupled with a power housing. The prime mover can be a motor. The power housing is at least provided with an engaging portion allowing the power device to be at least mounted to the functional device, and a coupling portion for providing a space or structure for coupling with the battery packs. When the power device and the functional device constitute a whole through the mounting portion and the engaging portion, the battery packs at least can be detached from the (Continued)

power housing. The power tool of the invention uses multi battery packs to provide power, and the operation is convenient.

18 Claims, 17 Drawing Sheets

(51) Int. Cl.
*A01D 34/78* (2006.01)
*A01D 34/81* (2006.01)
*A01D 101/00* (2006.01)

(56) References Cited

U.S. PATENT DOCUMENTS

| | | | | |
|---|---|---|---|---|
| 5,606,851 A * | 3/1997 | Bruener | ............. | A01D 34/6806 56/10.8 |
| 5,794,422 A | 8/1998 | Reimers et al. | | |
| 5,819,513 A * | 10/1998 | Braun | ................ | A01D 34/6806 56/11.9 |
| 5,910,091 A * | 6/1999 | Iida | ........................ | A01D 34/78 56/16.7 |
| 5,953,890 A * | 9/1999 | Shimada | ................ | A01D 34/78 56/10.2 R |
| 6,658,829 B2 * | 12/2003 | Kobayashi | ......... | A01D 34/6806 56/10.5 |
| 6,666,008 B2 * | 12/2003 | Iida | ........................ | A01D 34/78 56/11.9 |
| 6,826,895 B2 * | 12/2004 | Iida | ........................ | A01D 34/78 56/11.9 |
| 7,540,132 B2 * | 6/2009 | Shimada | ............... | A01D 34/828 56/11.9 |
| 7,884,560 B2 * | 2/2011 | Lucas | ................. | A01D 69/025 318/139 |
| 8,215,090 B2 * | 7/2012 | Ishikawa | ................ | A01D 34/82 248/637 |
| 8,429,885 B2 * | 4/2013 | Rosa | ...................... | A01D 34/69 56/11.9 |
| 8,653,786 B2 * | 2/2014 | Baetica | .................. | A01D 34/78 320/104 |
| 8,851,215 B2 * | 10/2014 | Goto | ........................ | B62M 6/55 180/65.1 |
| 8,963,497 B2 * | 2/2015 | Yang | ...................... | A01D 69/02 320/113 |
| 9,093,868 B2 * | 7/2015 | Baxter | .................. | A01D 34/008 |
| 9,711,767 B2 * | 7/2017 | Juenger | .................. | A01D 69/02 |
| 9,991,825 B1 * | 6/2018 | Ackerman | ................ | H02P 4/00 |
| 10,111,383 B2 * | 10/2018 | Yamaoka | ............... | A01D 34/78 |
| 2007/0095039 A1 | 5/2007 | Carlson et al. | | |

FOREIGN PATENT DOCUMENTS

| | | |
|---|---|---|
| CN | 102687625 A | 9/2012 |
| CN | 203072355 U | 7/2013 |
| CN | 203851502 U | 10/2014 |

\* cited by examiner

POWER TOOL

RELATED APPLICATION INFORMATION

This application claims the benefit under 35 U.S.C. § 119(a) of Chinese Patent Application No. CN 201410842915.7, filed on Dec. 30, 2014, the disclosure of which is incorporated herein by reference in its entirety.

FIELD OF THE DISCLOSURE

The present disclosure relates generally to power tools and, more particularly, to a power tool with a battery pack.

BACKGROUND OF THE DISCLOSURE

With the development and progress of society, the usability of tools is required higher and higher. For example, for the use of a lawn mower, the known lawn mower usually uses only one battery pack to supply electricity. So, there is a problem that is the battery pack can't supply electricity for a long time, which can't satisfy the requirement of continuously cutting grass for a long time.

The statements in this section merely provide background information related to the present disclosure and may not constitute prior art.

SUMMARY

In one aspect of the disclosure, a power tool includes a functional device including a functional component for realizing function of a tool and an operating component for a user to operate, and a power device which is detachably mounted to the functional device and able to supply power to the functional device. The functional device includes a functional housing which is at least formed with a mounting portion for mounting the power device. The power device includes a prime mover for driving the functional component when the power device is mounted to the functional device, a power housing for containing the prime mover, and a power source which at least includes battery packs detachably coupled with the power housing. The prime mover includes a motor which at least has an output shaft being able to rotate about a first axis. The power housing is at least provided with an engaging portion allowing the power device at least be mounted to the functional device, and a coupling portion for providing a space or structure for coupling with the battery packs. When the functional device and the power device constitute a whole through the mounting portion and the engaging portion, the battery packs at least can be detached from the power housing.

Furthermore, the power device is able to be mounted to the functional device along a first direction, the battery packs are able to be detached from the power housing along a second direction, the first direction is substantially parallel or perpendicular to the second direction.

Furthermore, the battery pack includes a battery pack electrical interface which is at least used to allow the battery pack to output electricity. The power device includes a device electrical interface for coupling with the battery pack electrical interface and allowing the electricity of the battery pack to be supplied to the motor. When the battery packs are coupled with the power housing, the device electrical interface is located between the motor and the battery packs.

Furthermore, the power housing is provided with more than two coupling portions for coupling with more than two battery packs. The battery packs include a battery pack electrical interface which is at least used to allow the battery packs to output electricity. The power device includes a device electrical interface for coupling with the battery pack electrical interface and allowing the electricity of the battery packs to be supplied to the motor. When the battery packs are coupled with the power housing, the battery pack electrical interface is located between the battery packs.

Furthermore, when the battery packs are coupled with the power housing, the device electrical interface is located between the motor and the battery packs.

Furthermore, the first direction is substantially parallel to the first axis. When the power device is mounted to the functional device, a ratio between an overlapped size of the motor and the functional device in the first direction and a size of the motor in the first direction is greater than or equal to 30% and less than or equal to 100%.

Furthermore, the second direction is substantially parallel to the first axis. When the power device is mounted to the functional device, a ratio between an overlapped size of the battery pack and the motor in the first direction and a size of the motor in the first direction is greater than or equal to 20% and less than or equal to 100%.

Furthermore, the output shaft of the motor is extended out from one side of the power housing, and the battery packs are detached from another side of the power housing.

Furthermore, the power device includes more than two motors, the power housing includes at least one coupling portion located between the motors.

Furthermore, the coupling portion at least includes an inserting recess for receiving the battery packs inserted along the second direction, the output shaft of the motor is extended out from one side of the power housing, and the inserting recess has an opening disposed on another side of the power housing.

In another aspect of the disclosure, a lawn mower includes a functional device including a first housing and a deck, and a power device including a second housing and a motor. The functional device further includes a frame for supporting the first housing. The first housing, the deck and the frame constitute a whole which is connected with an operating component. The power device further includes multi battery packs detachably mounted on the second housing. The motor is contained in the second housing. When the battery packs are mounted on the second housing, the motor is located between the battery packs.

Furthermore, the first housing and the second housing are as one housing.

Furthermore, the second housing is provided with inserting recesses for containing the battery packs.

Furthermore, when the battery packs are mounted on the second housing, the battery packs don't contact with each other.

Furthermore, a number of the battery packs is two which are disposed on a front and rear side of the motor respectively.

Furthermore, the battery packs are identical.

Furthermore, a center of gravity of the lawn mower is located between the battery packs.

Furthermore, when the battery packs are mounted on the second housing, the battery packs are align in at least one of a height direction and a width direction of the lawn mower.

Furthermore, the battery pack has a working voltage at least more than 56V.

Furthermore, the battery pack has a mass greater than 3 Kg.

The power tool in this invention uses multi battery packs to supply power, and the operation is very convenient.

Figure 1:
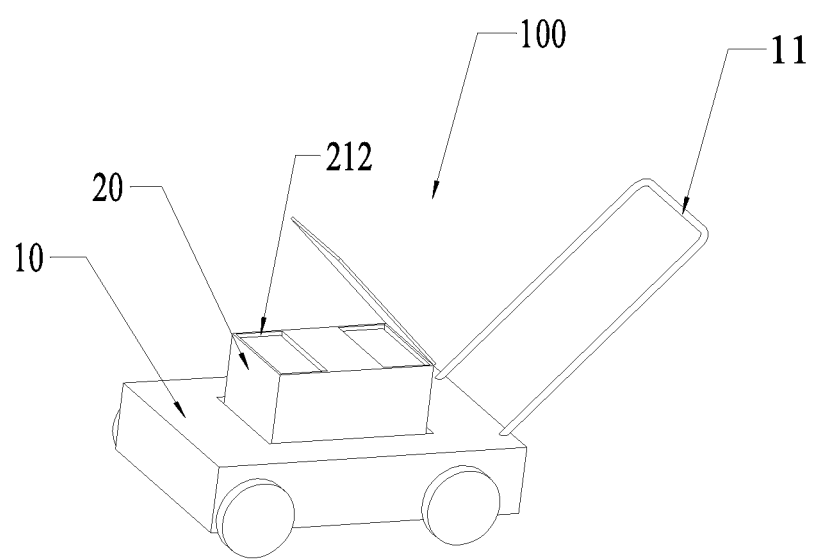
FIG. 1 is a schematic view of an exemplary power tool.
Figure 2:
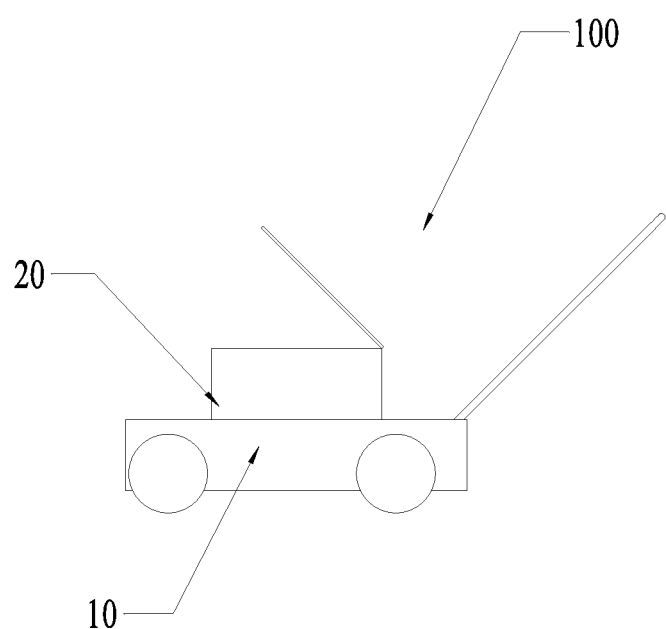
FIG. 2 is a side view of the power tool in FIG. 1.
Figure 3:
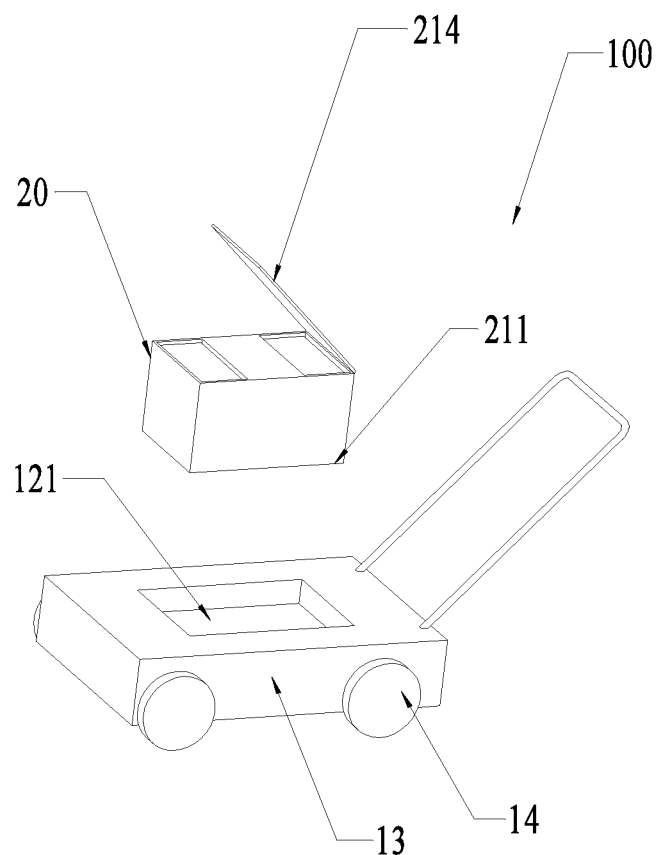
FIG. 3 is a schematic view of the power tool in FIG. 1, wherein a functional device is departed from a power device.
Figure 4:
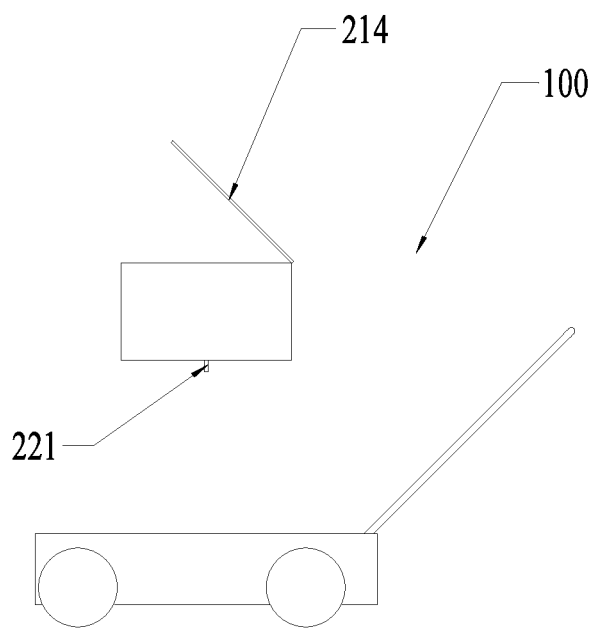
FIG. 4 is a side view of the power tool in FIG. 3.
Figure 5:
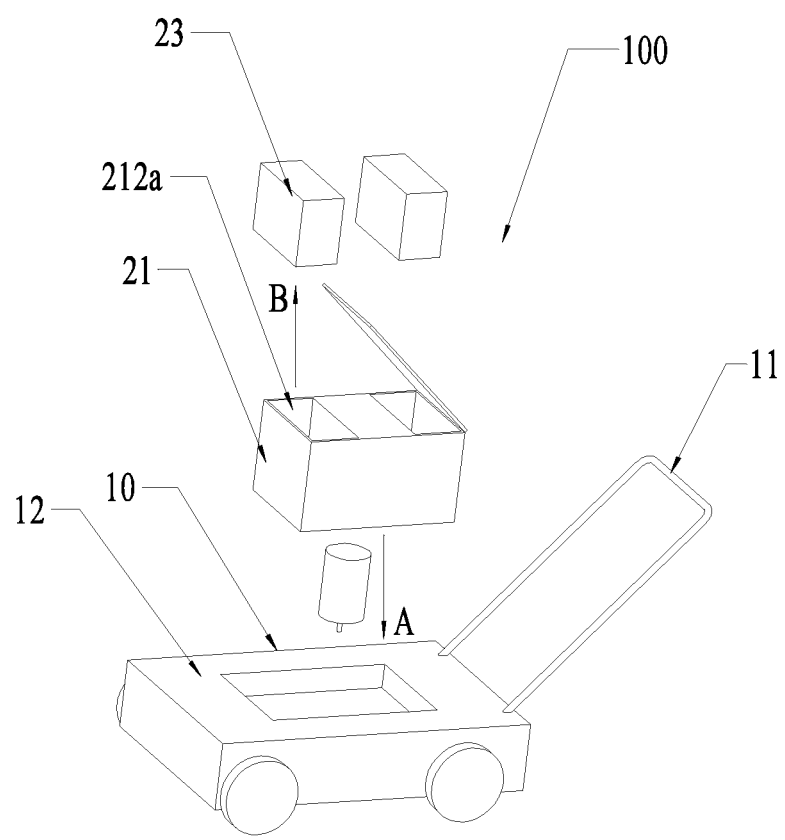
FIG. 5 is an exploded view of main portions of the power tool in FIG. 1.
Figure 6:
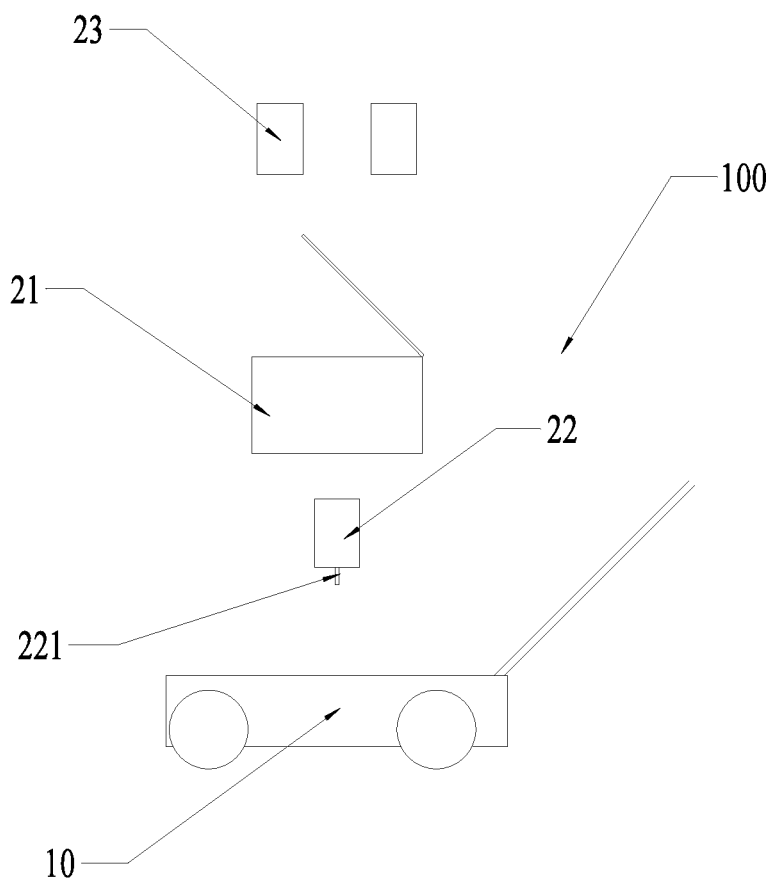
FIG. 6 is a side view of the power tool in FIG. 5.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Referring to FIGS. 1-6, a power tool 100 includes a functional device 10 and a power device 20. The functional device 10 is a main portion of the power tool 100 for realizing function. The power device 20 is an energy power portion of the power tool 100.

Specifically, the functional device 10 includes a functional component (not shown), an operating component 11 and a functional housing 12.

The functional component is used to realize the function of a tool of the power tool 100. For example, when the power tool 100 is a lawn mower, correspondingly, the functional component can be a cutting element. The cutting element can be driven by the functional device 10, which can be a cutting blade, for example. The operating component 11 is at least used for a user to push the power tool 100 and operate the power tool 100. The operating component 11 can include an operating switch for controlling the operation of the power tool 100 and a corresponding operating handle.

The functional housing 12 is used to contain or mount the functional component of the functional device 10 and connect with the operating component 11 etc. The functional housing 12 is formed with a mounting portion 121 for mounting the power device 20. The power device 20 can be designed to be detachable or non-detachable with the functional device 10.

The functional component, the functional housing 12 and other structural components constitute a whole. The whole is defined as a main body 13. The mounting portion 121 can be a part of the functional housing 12 or a part formed by the main body 13.

The power tool 100 further includes wheels 14 which allow the power tool 100 to move when the power tool 100 is pushed by the user. The wheels 14 are rotatably connected to the main body 13.

The power device 20 includes a prime mover (not shown), a power housing 21 and a power source (not shown).

The prime mover is used to drive the functional component when the power device 20 is mounted to the functional device 10. The prime mover can include at least a motor 22. The motor 22 has an output shaft 221 which is able to rotate about a first axis. When the motor 22 is mounted to the functional device 10, the output shaft 221 is connected with the functional component and able to drive the functional component to rotate or move to and from. For example, if it is needed to realize the function of cutting grass, when the power device 20 is mounted to the functional device 10, the output shaft 221 of the motor 22 is rotatably connected with the cutting blade. After a power supply is started, the output shaft 221 of the motor 22 is able to drive the cutting blade to rotate so as to realize the function of cutting grass.

The power housing 21 is used to contain the prime mover and the power source, so that the prime mover and the power source form a whole which is able to transmit electricity. The power source includes battery packs 23 which are detachably connected to the power housing 21. Specifically, the power housing 21 includes an engaging portion 211 and a coupling portion 212. The engaging portion 211 is engaged with the mounting portion 121 of the functional device 10, and the two portions 211, 121 cooperate so that the power device 20 can be mounted to the functional device 10 along a first direction A. The coupling portion 212 is used to provide a space or structure for coupling with the battery packs 23. Preferably, the mounting portion 121 is a recess which is able to partially receive the power housing 21, and the engaging portion 211 is a structure which is able to embed in the recess.

When the functional device 10 and the power device 20 constitute a whole, the battery packs 23 are detachable relative to other parts. Here, the word "detachable" means that the battery packs 23 can be detached and act as a single individual for the user.

For example, the battery packs 23 are able to detach from the power housing 21 along a second direction B. The second direction B is substantially parallel to the first direction A. Referring to FIGS. 1-6, after the battery packs 23 are inserted into the power housing 21 along a direction substantially parallel to the first direction A, the power device 20 is mounted to the functional device 10 along the first direction A. When it is needed to remove the battery packs 23 from the power housing 21, the battery packs 23 can be detached from the power housing 21 along the second direction B.

As an embodiment, the power tool 100 can configure two identical battery packs 23 which work as an electricity source. The two battery packs 23 have the same weight, shape, working voltage and circuit. Otherwise, the two battery packs 23 align in a width direction (a direction of x axis when taking the first direction A as the y axis) and a height direction (the first direction A) of the power tool 100.

Figure 7:
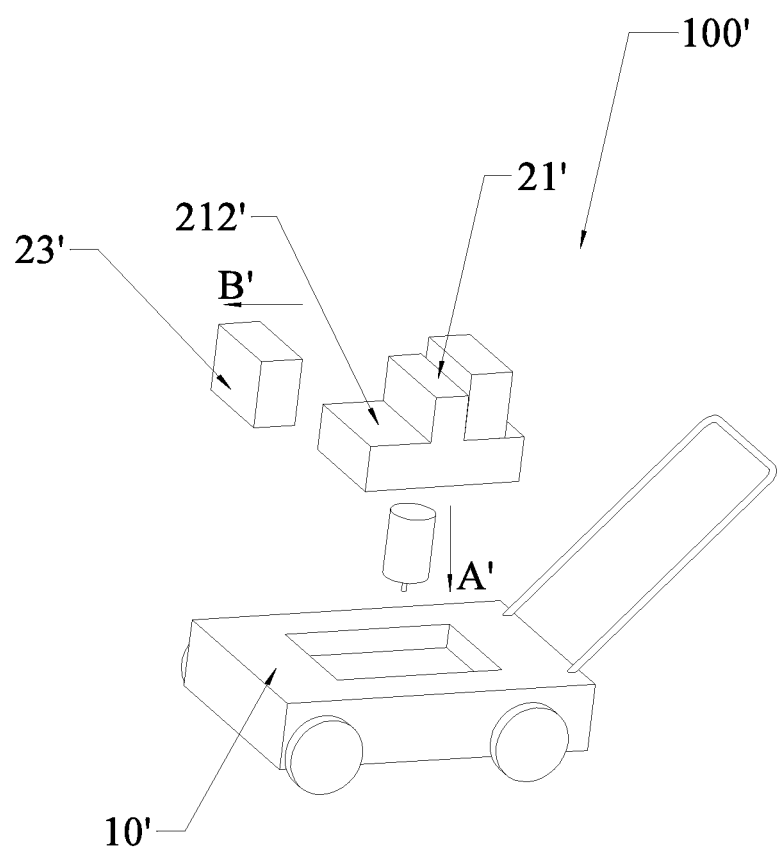
FIG. 7 is a schematic view of a second embodiment of a power tool.

As shown in FIG. 7, a power device 20' of a power tool 100' is mounted to a functional device 10' along a first direction A'. When it is needed to remove battery packs 23' from a power housing 21', the battery packs 23' can be detached from the power housing 21' along a second direction B' substantially perpendicular to the first direction A'.

Figure 8:
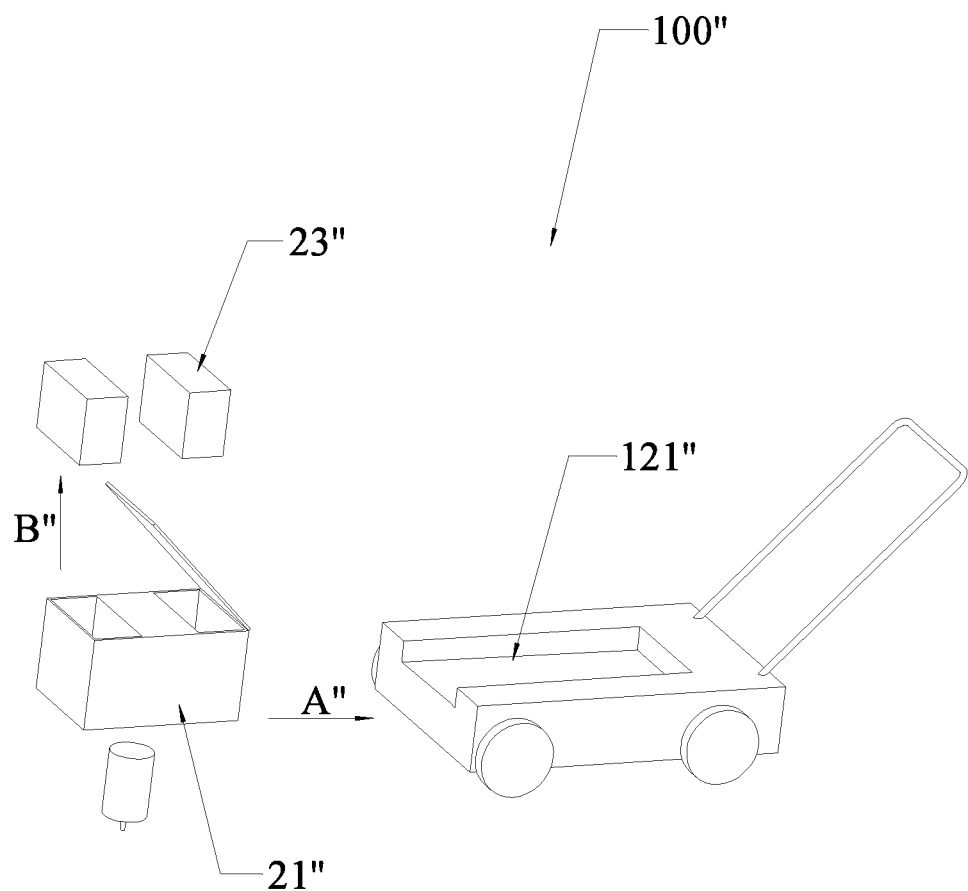
FIG. 8 is a schematic view of a third embodiment of a power tool.

For the power tool 100 in FIG. 1 and the power tool 100' in FIG. 7, the first directions A and A' are substantially perpendicular to a moving direction of the wheels. As shown in FIG. 8, a first direction A" can be substantially parallel to a moving direction of a power tool 100". In this condition, battery packs 23" can be detached from a power housing 21" along a second direction B". The second direction B" is substantially perpendicular to the first direction A" as shown in FIG. 8. However, it can be understood that the second direction B" can be substantially parallel to the first direction A".

The power tool 100 in FIGS. 1-6 includes one motor 22 and two battery packs 23. The power housing 21 is formed with two coupling portions 212 therein for containing the two battery packs 23 respectively. The motor 22 is located between the two coupling portions 212. When the battery packs 23 are mounted to the coupling portions 212, the motor 22 is also located between the two battery packs 23.

When the two battery packs 23 are mounted to their positions on the power tool 100 respectively, they don't contact with each other and the motor 22 is located between the two battery packs 23. In order to provide enough electricity, the battery packs 23 can have a working voltage more than 55V. Thus, the battery packs 23 and the motor 22 are the main portion of a weight of the power tool 100. And, because the two battery packs 23 are arranged on the two sides of the motor 22 symmetrically, a center of gravity of the power tool 100 is generally located between the two battery packs 23. As another embodiment, the center of gravity of the power tool 100 can be arranged near the motor 22.

Figure 9:
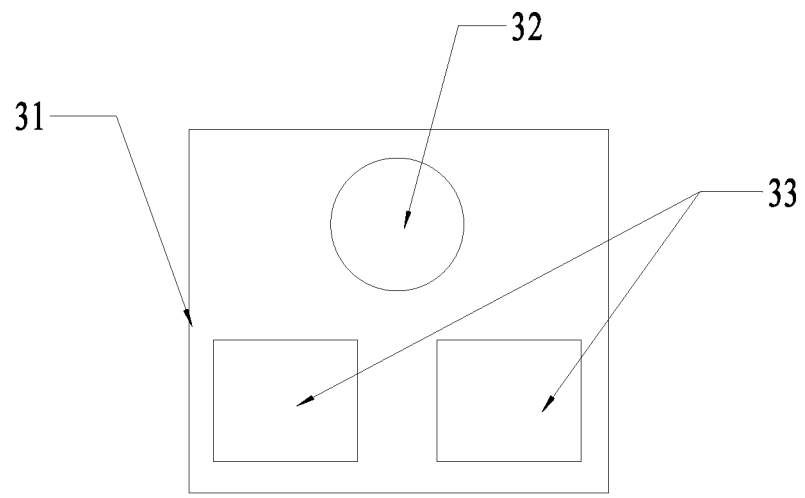
FIGS. 9-13 are schematic views showing five different position relationships of battery packs and a motor.

In another embodiment in FIG. 9, two battery packs 33 are disposed on the same side of a motor 32.

When there are more battery packs, the battery packs can be arranged around the motor. This arrangement makes the center of gravity of the power tool locate between the battery packs, and makes the center of gravity of the power tool and a center of gravity the motor overlap generally, so that a balance is guaranteed. In an embodiment in FIG. 10, there are three battery packs 43. A motor 42 is disposed between the three battery packs 43. One of the three battery packs 43 is disposed on one side of the motor 42, and the other two battery packs 43 are disposed on the other side of the motor 42.

Figure 11:
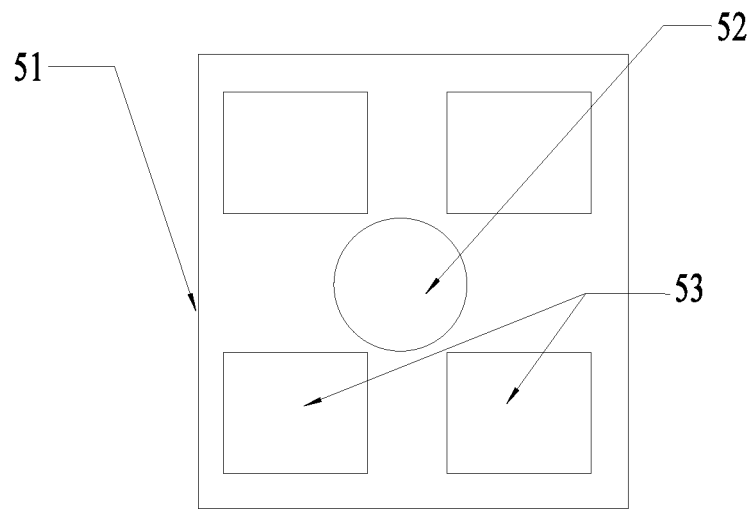

In an embodiment in FIG. 11, there are four battery packs 53. A motor 52 is disposed between the four battery packs 53. The four battery packs 53 are arranged around the motor 52.

Figure 10:
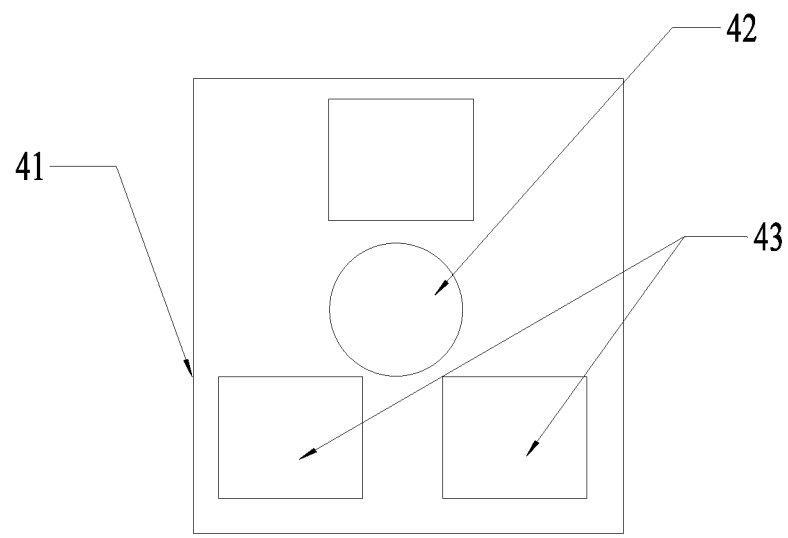

In the embodiments in FIGS. 10 and 11, the battery packs are arranged on a circumference direction of the motor uniformly (taking the motor shaft as a reference).

Figure 12:
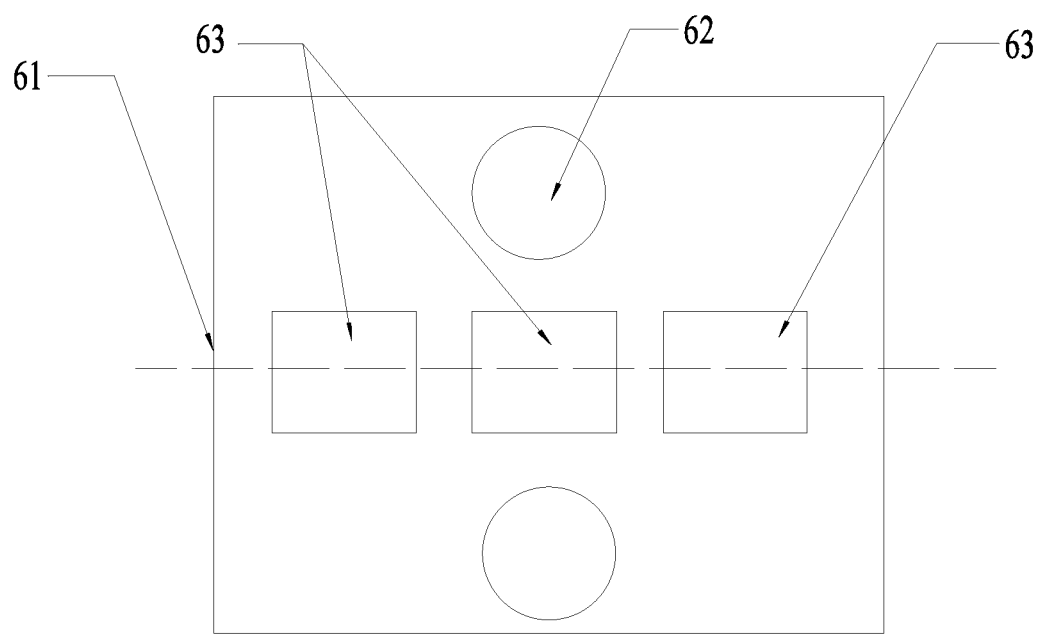
Figure 13:
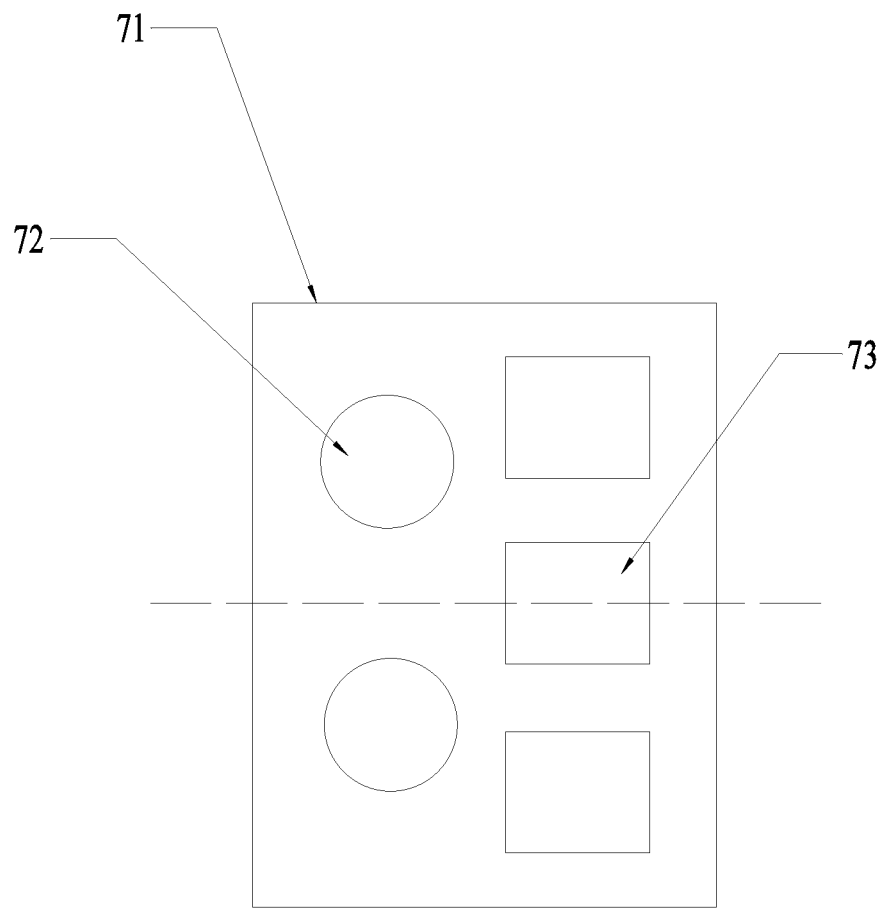
Figure 14:
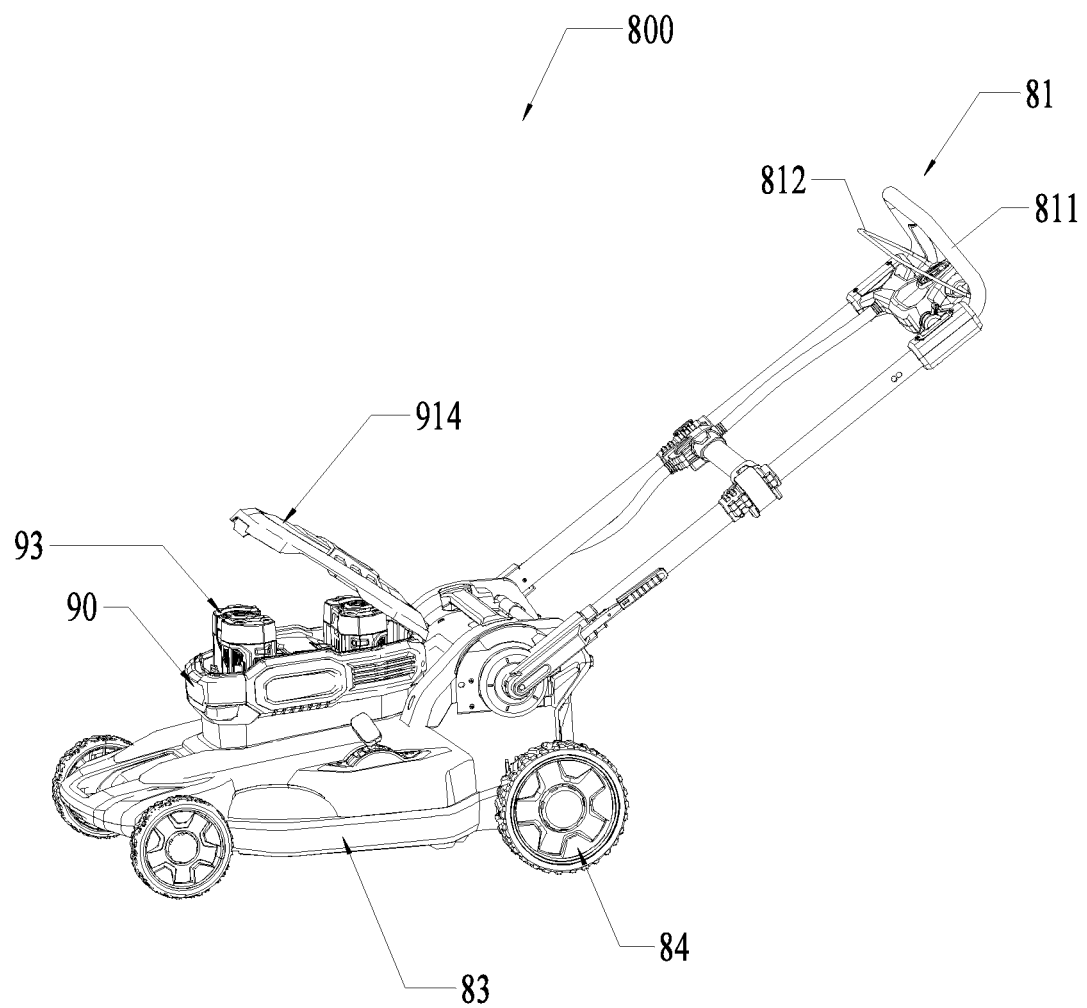
FIG. 14 is a schematic view of a hand-pushed lawn mower.
Figure 15:
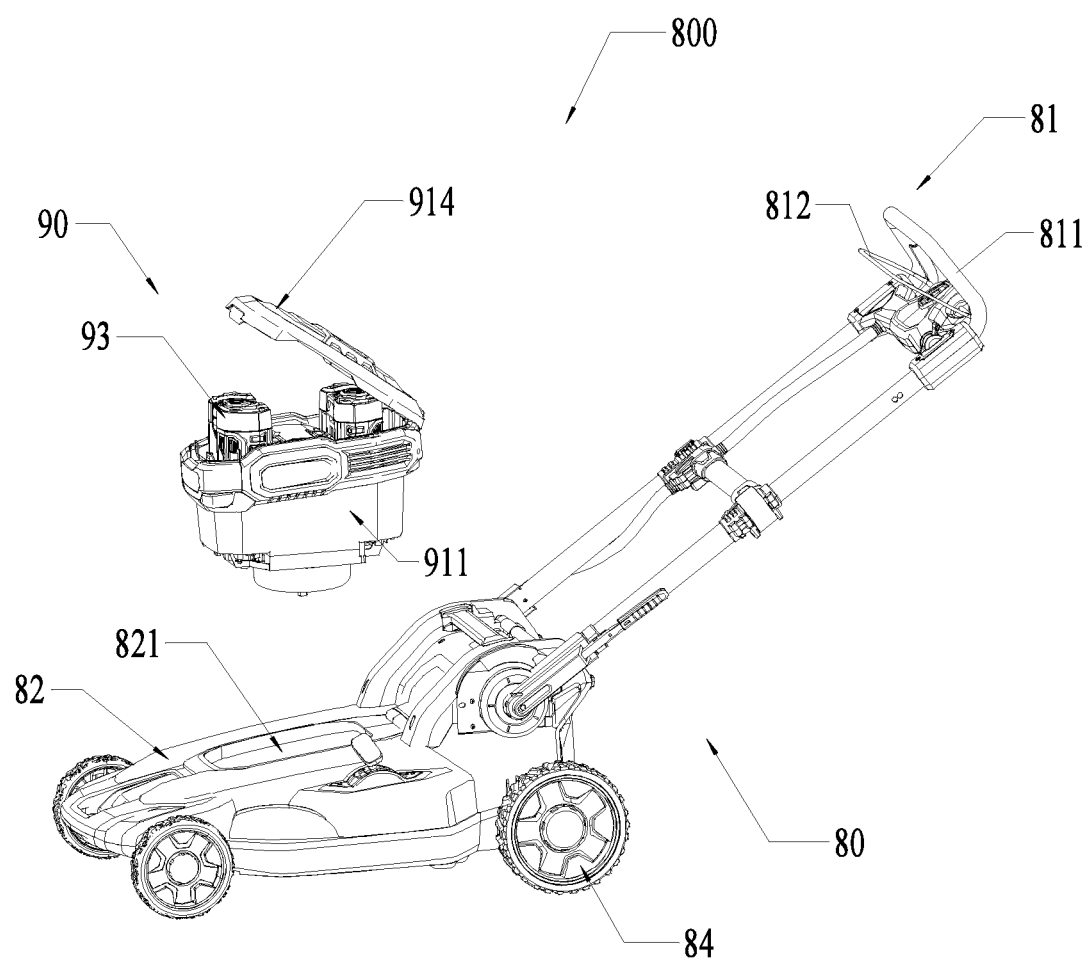
FIG. 15 is a schematic view of the lawn mower in FIG. 14, wherein the lawn mower is divided into two parts.
Figure 16:
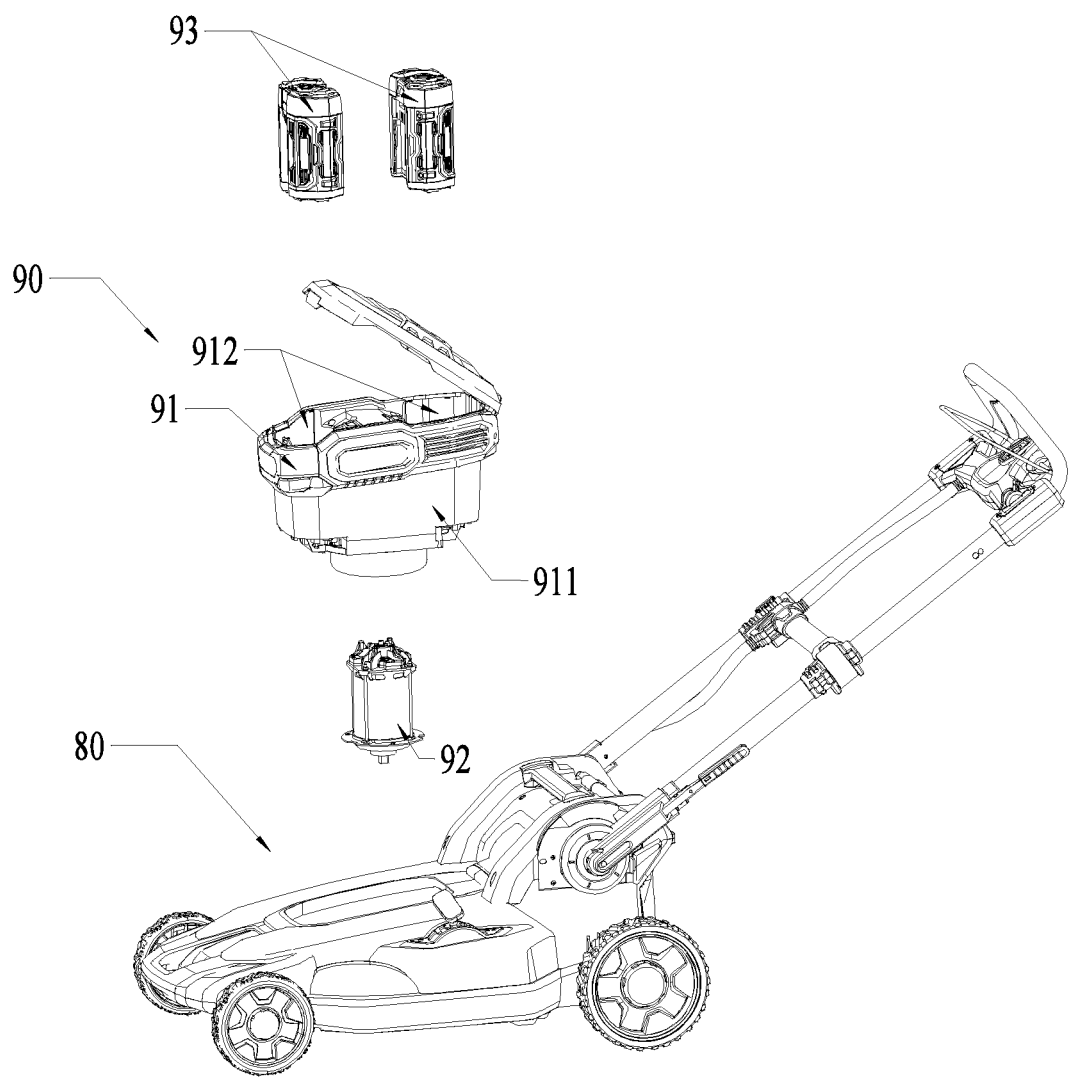
FIG. 16 is an exploded view of main portions of the lawn mower in FIG. 14.
Figure 17:
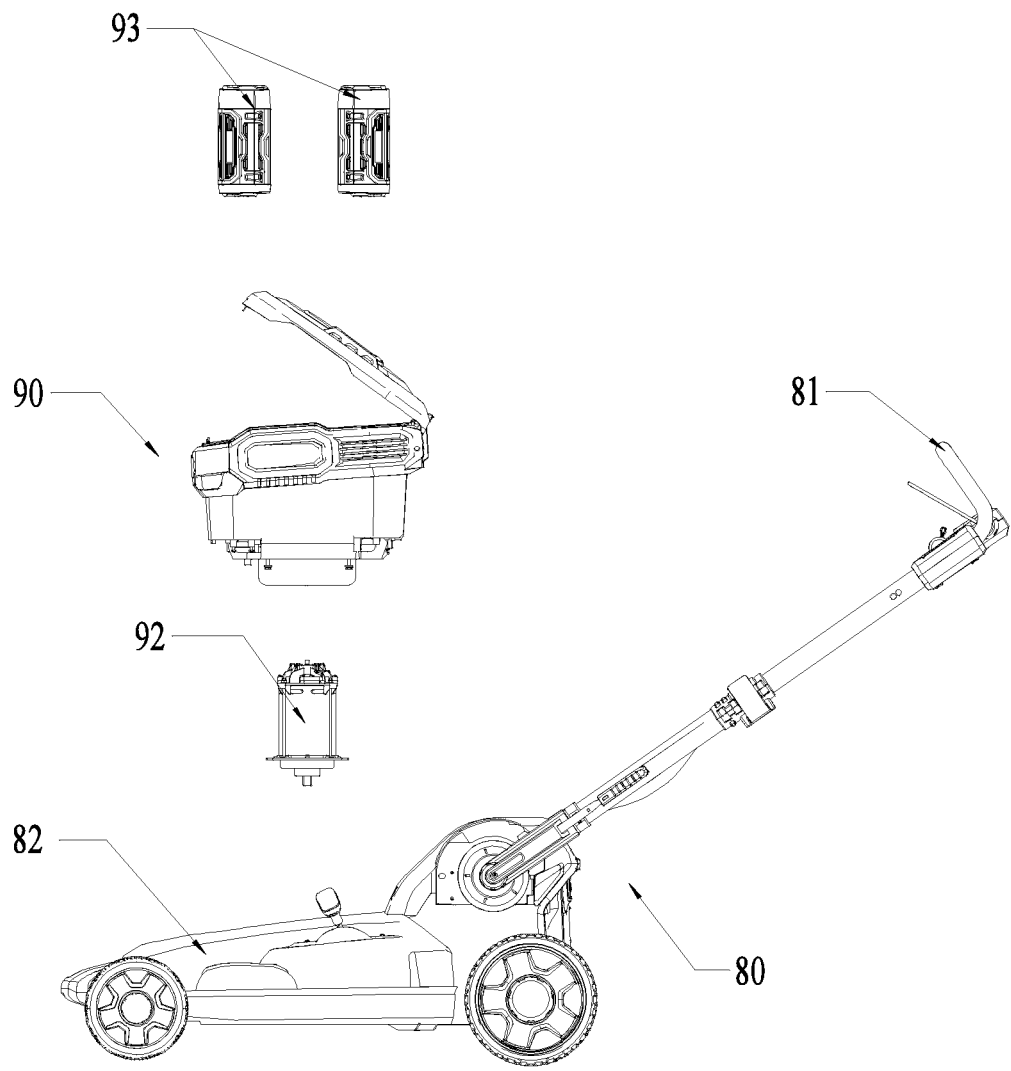
FIG. 17 is a side view of the lawn mower in FIG. 16.

When there are multi motors, embodiments in FIGS. 12 and 13 can be adopted.

In the embodiment in FIG. 12, two motors 62 are arranged symmetrically about an axis S. Three battery packs 63 are disposed between the two motors 62 and along the axis S.

In the embodiment in FIG. 13, two motors 72 are arranged symmetrically about an axis S'. Three battery packs 73 are disposed on the same side of the two motors 72. Two of the three battery packs 73 which are located on the two sides are disposed symmetrically about the axis S'. The remaining one of the three battery packs 73 which is located in the center is disposed between the two battery packs 73 which are disposed symmetrically about the axis S'.

As an embodiment, the power device 20 in FIGS. 1-6 is detachably mounted to the functional device 10. In order to make the battery pack 23 of the power device 20 satisfy the working requirements of the functional device 10 while the volume and the weight of the power tool 100 can't be affected, and reduce the burden of operation and carrying of the user, a ratio between the capacity of the battery pack 23 and the volume of the power device 20 is greater than or equal to 2000 Wh/m$^3$ and less than or equal to 60000 Wh/m$^3$, and a ratio between the capacity of the battery pack 23 and the weight of the power device 20 is greater than or equal to 10 Wh/kg and less than or equal to 300 Wh/kg.

Preferably, the volume of the power device 20 is greater than or equal to 0.025 m$^3$ and less than or equal to 0.05 m$^3$, the weight of the power device 20 is greater than or equal to 5 kg and less than or equal to 10 kg, and the capacity of the battery pack 23 is greater than or equal to 100 Wh and less than or equal to 1500 Wh. Further, when the volume of the power device 20 is equal to 0.025 m$^3$, the ratio between the capacity of the battery pack 23 and the volume of the power device 20 is greater than or equal to 4000 Wh/m$^3$ and less than or equal to 60000 Wh/m$^3$. When the volume of the power device 20 is equal to 0.05 m$^3$, the ratio between the capacity of the battery pack 23 and the volume of the power device 20 is greater than or equal to 2000 Wh/m$^3$ and less than or equal to 30000 Wh/m$^3$. Further, when the weight of the power device 20 is equal to 10 kg, the ratio between the capacity of the battery pack 23 and the weight of the power device 20 is greater than or equal to 10 Wh/kg and less than or equal to 150 Wh/kg. When the weight of the power device 20 is equal to 5 kg, the ratio between the capacity of the battery pack 23 and the weight of the power device 20 is greater than or equal to 20 Wh/kg and less than or equal to 300 Wh/kg.

Otherwise, for the battery packs, if they are too heavy, they will affect the user to use, and if they are too light, they can result electricity shortage. So a balance is needed. As an embodiment, the weight of a single battery pack should be in a range of 1-3.5 kg.

As a specific embodiment, a lawn mower 800 in FIGS. 14-17 includes a functional device 80 and a power device 90. The functional device 80 is a main portion of the lawn mower 800 for realizing function. The power device 90 is an energy power portion of the lawn mower 800.

In order to illustrate the lawn mower conveniently, hereinafter, the relative position relationship of the various components of the lawn mower will be illustrated taking an orientation of the lawn mower under normal use as reference. This is just for illustrating the relative position relationship, not the absolute position.

Specifically, the functional device 80 includes a first housing 82, a frame (not shown), a cutting blade (not shown) and a deck (not shown). The frame is used to support the first housing 82. The deck is mounted to the frame, then they and the first housing 82 constitute a whole. The deck is formed downwardly with a cutting chamber for cutting grass and exhausting grass. The cutting blade is able to rotate relative to the deck so as to cut the grass extending into the cutting chamber. The cutting chamber is a chamber opened downward totally or partially.

It is noted that the cutting blade can be rotatably connected with the frame through the power device 90.

The first housing 82 is used to cover the frame and the structure or cables mounted on the frame which should not be exposed.

The first housing 82, the frame, the cutting blade and the deck constitute a whole which is defined as a main body 83.

The functional device 80 further includes an operating component 81 besides the main body 83.

The operating component 81 is connected to the rear portion of the main body 83, which is for the user to push and operate the lawn mower 800. Specifically, besides a linkage component connecting to the rear portion of the main body 83, the operating component 81 further includes an operating handle 811 for the user to grip and push, and a trigger 812 for controlling the lawn mower 800 to operate or not.

In order to facilitate the user to push the lawn mower 800, wheels 84 are rotatably connected with the main body 83. The wheels 84 can be divided into two groups which are disposed on the front and rear sides of the main body 83 respectively. Each group has two wheels 84 which are coaxial.

The power device 90 includes a second housing 91, a motor 92 and battery packs 93.

The second housing 91 is used to contain the motor 92, or the second housing 91 is formed with a portion for coupling with the motor 92.

The motor 92 has an output shaft 921. The output shaft 921 can be connected with the cutting blade directly or drive the cutting blade through a transmission mechanism.

After the power device 90 is connected with the functional device 80, when the trigger 812 is operated by the user, the motor 92 is supplied power by the battery packs 93 so as to drive the cutting blade and realize the function of cutting grass.

The battery packs 93 are detachably connected with the second housing 91. That is, the battery packs 93 are detachable. So, the user can detach the battery packs 93 and charge the battery packs 93, or use the battery packs 93 to supply power to other power tools.

The second housing 91 includes an engaging portion 911 and a coupling portion 912. The engaging portion 911 is engaged with a mounting portion 921 of the functional device 90, so that the power device 90 can be mounted to the functional device 80 along a vertically downward direction. The coupling portion 912 is used to provide a space or structure for coupling with the battery packs 93. Preferably, the mounting portion 821 is a recess for partially receiving the second housing 91. The engaging portion 911 is a structure which is able to embed in the recess. The coupling portion 912 is two containing recesses which are opened upward, and the battery packs 93 can be inserted into the two containing recesses.

The second housing 91 is formed with a chamber (not shown) between the two coupling portion 912. The motor 92 is mounted in the chamber. The two battery packs 93 don't contact with each other because they are disposed in the respective containing recess.

Otherwise, in order to protect the two battery packs 93, a battery pack cover 914 is pivotably connected with the second housing 91. The battery pack cover 914 is able to cover the containing recesses. However, there may be multi covers according to the number of the battery packs. In order to lock the battery pack cover 914, the second housing 91 is provided with or connected with a locking structure.

When the functional device 80 and the power device 90 constitute a whole, the battery packs 93 are detachable relative to other parts. Here, the word "detachable" means that the battery packs 93 can be detached directly and act as a single individual for the user.

More specifically, the battery packs 23 can be detached from the power housing 21 along an upward direction, while the power device 90 can be detached from the functional device 80 along the upward direction. However, for an unprofessional user, the power device 90 should not be detachable directly relative to the functional device 80.

As an embodiment, the lawn mower 800 can configure two identical battery packs 93 as an electricity source. The two battery packs 93 have the same weight, shape, working voltage and circuit. Otherwise, the two identical battery packs 93 are align in a left-right direction and a height direction (an up and down direction) of the lawn mower. However, the two identical battery packs 93 can align only in one of the left-right direction and the height direction. Preferably, the battery packs 93 have an output voltage more than 56V.

If the battery packs 93 are constituted by 18650 cells, the weight of the battery packs 93 is considerable. And in the lawn mower 800, the mass of the motor 92 accounts for a large proportion. As mentioned previously, the center of gravity of the lawn mower 800 should be near the motor 92 and between the two battery packs 93. Even the lawn mower 800 is mounted with a grass collecting bag on its rear side and even the grass collecting bag is full, the center of gravity of the lawn mower 800 should not be changed too much, which should be still between the two battery packs 93, because the mass of the grass collecting bag and the grass clippings are not enough to change the center of gravity of the lawn mower 800.

As an optional embodiment, based on the embodiment described above, the first housing 82 can be non-removably connected with the second housing 91. Further, the first housing 82 and the second housing 91 are two integrated portions. That is, except the battery packs 93, the power device 90 is non-removably connected with the functional device 80. For the user, the power device 90 and the functional device 80 are a whole.

Otherwise, the battery packs 93 can be detached from the second housing 91 along a direction deviated from the vertical direction (the up and down direction).

Otherwise, when the power device 90 is mounted to the functional device 80, a ratio between an overlapped size of the motor 92 and the functional device 80 in the height direction and the size of the motor 92 in the height direction is greater than or equal to 30% and less than or equal to 100%, and in particular 80%. When the power device 90 is mounted to the functional device 80, a ratio between an overlapped size of the battery packs 93 and the motor 92 in the height direction and the size of the motor 92 in the height direction is greater than or equal to 20% and less than or equal to 100%, and in particular 50%. Thus, when the power device 90 is mounted to the functional device 80, the most of the motor 92 is overlapped with the functional device 80 in the first direction A as soon as possible, so that the center of gravity of the power device 90 is near the functional device 80 in the height direction. And the center of gravity of the whole power tool 100 is on the functional device 80 in the height direction, so that the center of gravity of the whole power tool 100 is lowered and the stability of the whole power tool 100 is improved during operation.

Preferably, the output shaft of the motor 92 is extended out from one side of the second housing 91, and the battery packs 93 are removed from the other side of the second housing 91. This arrangement facilitates to mount the cutting blade to the output shaft.

However, different battery packs may have different inserting directions. But, the angle differences between different inserting directions should not be great, and should not be more than 45 degrees.

Figure 18:
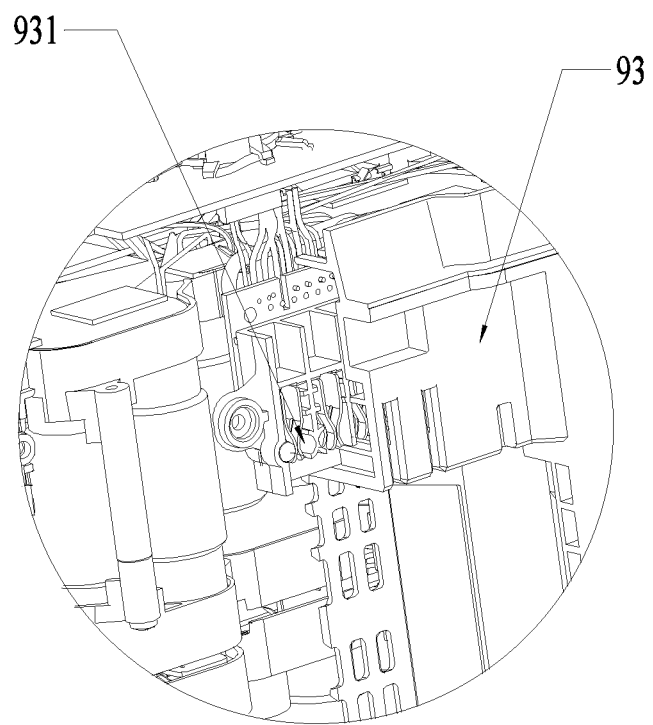
FIG. 18 is a schematic view showing an internal structure of battery packs of the lawn mower in FIG. 14.
Figure 19:
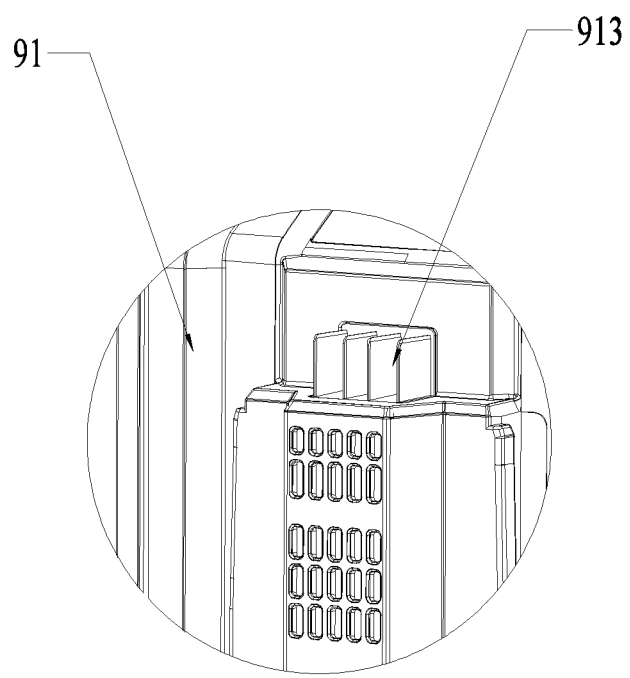
FIG. 19 is a schematic view showing a portion in the lawn mower in FIG. 14 for engaging with the battery packs.

Referring to FIGS. 18-19, the battery packs 93 further include a battery pack electrical interface 931 for allowing the battery packs 93 to output electricity to the motor 92. Preferably, the battery pack electrical interface 931 is located on one side of the battery packs 93 close to the motor 92 when the battery packs 93 are coupled to the coupling portion 912. So, the battery pack electrical interface 931 is located between the battery packs 93 and the motor 92, and between the two battery packs 93. The second housing 91 of the power device 90 is provided with a device electrical interface 913 for coupling with the battery pack electrical interfaces 931. After the battery pack electrical interface 931 and the device electrical interface 913 are coupled with each other, the battery packs 93 can supply electricity to the motor 92 and make the motor 92 work. Preferably, the device electrical interface 913 is located between the motor 92 and the battery packs 93 and faces the battery pack electrical interface 931. Because the battery pack electrical interface 931 is also located between the battery packs 93 and the motor 92, the power supply circuit can be disposed between the two battery packs 93. Thus, the space is saved and the length of the cables is reduced.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A power tool, comprising:
a functional device comprising a functional component for realizing function of a tool and an operating component for a user to operate; and
a power device which is detachably mounted to the functional device and able to supply power to the functional device,
wherein the functional device comprises:
a functional housing which is at least formed with a mounting portion for mounting the power device,
wherein the power device comprises:
a prime mover for driving the functional component when the power device is mounted to the functional device;
a power housing for containing the prime mover; and
a power source comprises battery packs detachably coupled with the power housing,
wherein the prime mover comprises:
a motor which at least has an output shaft being able to rotate about a first axis, wherein the power housing comprises:
an engaging portion allowing the power device at least be mounted to the functional device; and
a coupling portion for providing a space or structure for coupling with the battery packs,
wherein when the functional device and the power device constitute a whole through the mounting portion and the engaging portion, the battery packs at least can be detached from the power housing,
wherein each of the battery pack comprises a plurality of cells, each of the battery packs is individually detachable for use by other power tools, at least one cover is pivotally connected to the power housing for covering, and allowing access to, the battery packs, and the power housing is provided with or connected with a locking structure for locking the cover, and
wherein the battery pack comprises a battery pack electrical interface which is at least used to allow the battery packs to output electricity, the power housing comprises a device electrical interface for coupling with the battery pack electrical interface and allowing the electricity of the battery packs to be supplied to the motor, the device electrical interface is located between the motor and the battery packs when the battery packs are coupled with the power housing, and the device electrical interface is located between the battery packs when the battery packs are coupled with the power housing.

2. The power tool of claim 1, wherein the power device is able to be mounted to the functional device along a first direction, the battery packs are able to be detached from the power housing along a second direction, the first direction is substantially parallel or perpendicular to the second direction.

3. The power tool of claim 2, wherein the first direction is substantially parallel to the first axis, when the power device is mounted to the functional device, a ratio between an overlapped size of the motor and the functional device in the first direction and a size of the motor in the first direction is greater than or equal to 30% and less than or equal to 100%.

4. The power tool of claim 2, wherein the second direction is substantially parallel to the first axis, when the power device is mounted to the functional device, a ratio between an overlapped size of the battery pack and the motor in the first direction and a size of the motor in the first direction is greater than or equal to 20% and less than or equal to 100%.

5. The power tool of claim 2, wherein the coupling portion at least comprise an inserting recess for receiving the battery packs inserted along the second direction, the output shaft of the motor is extended out from one side of the power housing, and the inserting recess have an opening disposed on another side of the power housing.

6. The power tool of claim 1, wherein the power housing is provided with more than two coupling portions for coupling with more than two battery packs, and when the battery packs are coupled with the power housing, the battery pack electrical interface is located between the battery packs.

7. The power tool of claim 1, wherein the output shaft of the motor is extended out from one side of the power housing, and the battery packs are detached from another side of the power housing.

8. The power tool of claim 1, wherein the power device comprises more than two motors, the power housing comprises at least one coupling portion located between the motors.

9. A lawn mower, comprising:
a functional device comprising a first housing and a deck; and
a power device comprising a second housing and a motor,
wherein the functional device further comprises a frame for supporting the first housing, and the first housing, the deck and the frame constitute a whole which is connected with an operating component,
wherein the power device further comprises multi battery packs detachably mounted on the second housing, the motor is contained in the second housing, and when the battery packs are mounted on the second housing the motor is located between the battery packs,
wherein each of the battery pack comprises a plurality of cells, each of the battery packs is individually detachable for use by other power tools, at least one cover is pivotally connected to the second housing for covering, and allowing access to, the battery packs, and the second housing is provided with or connected with a locking structure for locking the cover, and wherein the battery pack comprises a battery pack electrical interface which is at least used to allow the battery packs to output electricity, the second housing comprises a device electrical interface for coupling with the battery pack electrical interface and allowing the electricity of the battery packs to be supplied to the motor, the device electrical interface is located between the motor and the battery packs when the battery packs are coupled with the second housing, and the device electrical interface is located between the battery packs when the battery packs are coupled with the second housing.

10. The lawn mower of claim 9, wherein the first housing and the second housing are as one housing.

11. The lawn mower of claim 9, wherein the second housing is provided with inserting recesses for containing the battery packs.

12. The lawn mower of claim 9, wherein when the battery packs are mounted on the second housing, the battery packs don't contact with each other.

13. The lawn mower of claim 9, wherein a number of the battery packs is two which are disposed on a front and rear side of the motor respectively.

14. The lawn mower of claim 9, wherein the battery packs are identical.

15. The lawn mower of claim 9, wherein a center of gravity of the lawn mower is located between the battery packs.

16. The lawn mower of claim 9, wherein when the battery packs are mounted on the second housing, the battery packs are align in at least one of a height direction and a width direction of the lawn mower.

17. The lawn mower of claim 9, wherein the battery pack has a working voltage at least more than 56V.

18. The lawn mower of claim 9, wherein the battery pack has a mass greater than 3 Kg.

* * * * *